(No Model.)
J. B. PERREUR-LLOYD.
GALVANIC BATTERY.
No. 358,464. Patented Mar. 1, 1887.
FIG_1_
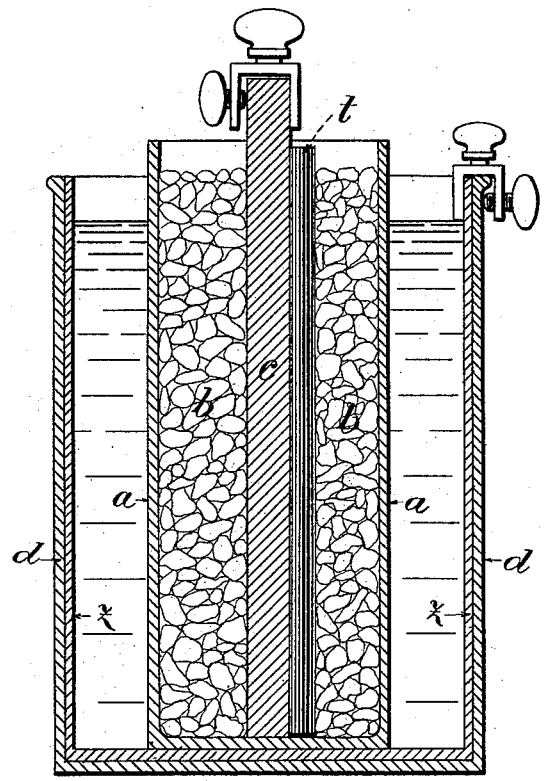
FIG_2_
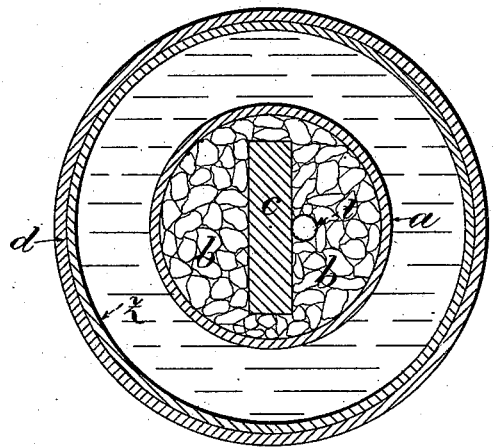
Witnesses:
Inventor:

UNITED STATES PATENT OFFICE.

J. B. PERREUR-LLOYD, OF PARIS, FRANCE.

GALVANIC BATTERY.

SPECIFICATION forming part of Letters Patent No. 358,464, dated March 1, 1887.

Application filed September 4, 1886. Serial No. 212,694. (No model.) Patented in France August 11, 1886.

*To all whom it may concern:*

Be it known that I, J. B. PERREUR-LLOYD, of the firm of Perreur-Lloyd & Etève, of Paris, in the Republic of France, have invented an Improved Galvanic Battery, (for which I have obtained Letters Patent of France for fifteen years, dated August 11, 1886;) and I do hereby declare that the following is a full and exact description thereof, reference being made to the accompanying drawings.

The galvanic battery forming the subject of this invention is very durable, of great intensity, and high electro-motive force. It requires no manipulation from the first closing of the circuit to complete exhaustion of the current, and gives no trace of polarization. One of its component elements is based on an essentially new principle, which consists in introducing into the pores of a conducting body a powerful salt, the slow but constant ulterior decomposition of which contributes to the formation of the electric current.

For the formation of this improved battery I employ the following methods or processes.
The preparation of the said salt comprises four operations:

First. Crystallized sulphate of protoxide of iron with seven equivalents of water (protosulphate of iron) is submitted to the action of commercial nitric acid. About five hundred grams of sulphate is mixed with five hundred cubic centimeters of acid, the sulphate being added in small quantities at a time in order that the dissolution may proceed gradually. The proportions of acid vary according as it is desired to increase the intensity of the current.

Second. When the solution is effected, one thousand cubic centimeters of sulphuric acid of good quality is added to the above mixture of sulphate of protoxide of iron (protosulphate of iron) and nitric acid. The acid is added little by little while the mixture is agitated, and sulphate of peroxide (persulphate) is soon seen to form. The whole mass assumes the form of a thick white paste, which is kept stirred till the addition of the sulphuric acid is completed.

Third. Into the thick paste thus obtained may be put one hundred and twenty-five grams of bichromate of potash, to assist the reactions of the battery.

Four. When the thick paste has attained a uniform tint, after the bichromate is perfectly dissolved, there is added to this mixture of salts retort-carbon broken into tolerably fine pieces, of from about five to ten millimeters diameter, and the mixture is well stirred. When the salt has penetrated well into the pores of the carbon, the battery may be charged. It is preferable to heat the carbon before putting it into the mixture resulting from the three first operations, so that its pores are better filled and become completely saturated with salt, because the air in the pores of the hot carbon contracts on contact with the cold mixture, and thereby facilitates the entrance of the salt into the said pores.

If coke is used instead of retort-carbon, it is advisable to prepare it in the following manner before placing it in the preceding mixture of salts: The coke broken up coarsely is placed in a liquid composed of one part, by volume, of hydrochloric acid, sulphuric acid, and ten parts of water. It is steeped for several days in this liquid, and is very frequently stirred or otherwise agitated, to facilitate the dissolution of foreign matters. After a few days it is washed in large quantities of water, and then dried.

The salt may be prepared as follows: First, one part, by weight, of bichromate of potash is dissolved in a mixture of one part, by volume, of water and commercial sulphuric acid at 66°. When the dissolution is complete, two parts, by weight, of nitrate of potash and two parts of sulphate of ammonia are added, so that the mixture of these materials forms a sirup not too thick in consistency; second, into this sirup is placed hot retort-carbon or coke, prepared as explained in the first-described process, until complete absorption of the sirup is effected. The mixture of coke and sirup is stirred frequently, in order that the latter may penetrate thoroughly into the pores of the carbon or coke, the sirup being preferably supplied in excess; finally, the coke thus prepared is dried in the open air.

The battery is formed as follows: As shown in vertical and horizontal sections in Figures 1 and 2, respectively, of the annexed drawings, a rod or plate of paraffined retort-carbon or other suitable conductor, *c*, is placed in the center of a porous vessel, *a*, of suitable shape and size. The carbon or coke b, impregnated with the exciting-salt, is filled in around the carbon c and nearly up to the upper edge of the porous vessel a. The latter, with its contents, is then placed inside the zinc element z, and the whole in a vessel of glass or other insulating casing, d. Water, with sulphate of soda, is then placed in the space outside the porous vessel a. A small glass tube, t, placed by the side of the carbon c, allows gas and air to escape.

The battery may be made to occupy less space by using water-tight soldered zincs covered externally, if necessary, with a case of india-rubber or other insulating material, instead of the outer glass or other containing vessel, d. These zincs are also varnished externally, to effect a more complete insulation.

Iron may be employed instead of zinc, if preferred, so as to bring into play only iron and its salts.

This improved battery, constituted as above described, furnishes a constant powerful current of very long duration. When it is exhausted, it is only necessary to pour some more exciting-salt onto the carbon or coke conductor or element in order to obtain a very appreciable further duration of current, and so on, several times in succession, without any other manipulation of the battery being necessary.

I claim—

1. A galvanic battery composed of an electrode, c, pieces of retort-carbon or coke b, surrounding the said electrode c and saturated with a sulphate, a porous vessel, a, containing the said rod or plate c and the said pieces of carbon or coke b, a zinc element, z, and an insulating container, d, as hereinbefore described, and illustrated in the drawings hereto annexed.

2. In a galvanic battery, the combination of a conducting rod or plate, c, pieces of retort-carbon or coke b, saturated with sulphate of iron and bichromate of potash, a porous vessel, a, and a water-tight containing a zinc element with an insulating-cover, as hereinbefore described.

3. The process for preparing the retort-carbon or other similar porous conducting element or electrode, which process consists in intimately mixing the retort-carbon broken into coarse pieces with powerful salts—such as anhydrous sulphate of peroxide of iron, (persulphate of iron)—as hereinbefore described.

J. B. PERREUR-LLOYD.

Witnesses:
ROBT. M. HOOPER,
ALPHONSE BLÉTRY.